United States Patent [19]

Arseneault et al.

[11] Patent Number: 4,614,499
[45] Date of Patent: Sep. 30, 1986

[54] SIMULATOR FOR USE AS A NEUROSURGICAL AID IN DETERMINING POTENTIAL PATHS FOR THE IMPLANTATION OF PROBES THROUGH THE HUMAN BODY

[75] Inventors: Pierre-Michel Arseneault, Charlesbourg; Michel Boulianne, Jonquière; Louis Cloutier, Sillery; Sanjib K. Ghosh; Paul Labissonniere, both of Ste-Foy; Pierre Marcotte, Quebec; Dinh N. Nguyen, Sillery, all of Canada

[73] Assignee: Universite Laval, Quebec, Canada

[21] Appl. No.: 728,277

[22] Filed: Apr. 29, 1985

[51] Int. Cl.[4] ............................................. G09B 23/28
[52] U.S. Cl. ..................................... 434/262; 434/218
[58] Field of Search ........................ 434/218, 262, 267

[56] References Cited

U.S. PATENT DOCUMENTS 3,487,559 1/1970 Freedman ........................... 434/218
4,014,109 3/1977 Schramm ........................... 434/218
4,436,684 3/1984 White ............................. 434/267 X Primary Examiner—Harland S. Skogquist
Attorney, Agent, or Firm—Robic, Robic & Associates

[57] ABSTRACT

A simulator, for use with stereoradiographs, as a neurosurgical aid in locating potential paths for the implantation of probes in selected locations of the brain. It has a support, on the top surface of which is mounted a pair of radiographs disposed for stereoscopic viewing. An elongated ruler lies over the stereoradiographs and is movable in translation over them. A pair of transparent flat plotting plates are mounted on the ruler and are slidable therealong. Each plotting plate has a circular hole and a transparent circular disc is rotatable around this hole; a radial line extending from the center of the disc giving a "floating line" in the stereoscopically viewed model to simulate a probe to be implanted in the brain.

11 Claims, 7 Drawing Figures

SIMULATOR FOR USE AS A NEUROSURGICAL AID IN DETERMINING POTENTIAL PATHS FOR THE IMPLANTATION OF PROBES THROUGH THE HUMAN BODY

BACKGROUND OF THE INVENTION

1. Field of the Invention

The present invention relates to a simulator utilizing photogrammetry for use, as a mechanical aid, in surgery, for determining potential paths for the implantation of probes through the human body, particularly the brain.

2. Prior Art and Technical Consideration

For a large number of patients suffering from epilepsy, the disease cannot be controlled by medication and their only hope of cure is through surgery which rests in locating and destroying the epileptic area in the brain. Unfortunately, the present operational technique still deals with a non-negligible limitations and the possibility of curing most epileptic patients is yet quite a challenge.

The technique presently being applied is based mainly on an analysis of the behavior of electric waves, so called "depth waves", that occur within the brain during an epileptic stroke. For this purpose, probes of the type disclosed in U.S. Pat. No. 4,245,645 of Jan. 20, 1981 are used of which the tips, when the probes are implanted in the cerebral cortex, constitute a series of waves detectors capable of precisely localizing diseased areas of the brain. It is obvious however that the implantation has to be done with great skill, care and knowledge, to avoid the probes striking any brain vessels, particularly arteries, which would provoke hemorrhages. This is precisely a limitation, if there is, in the present technique which, otherwise, is extremely promising in the treatment of not only epileptic but also of other types of brain diseases. Stated otherwise, the neurosurgeon ought to be provided with a tool that would allow him to rapidly and easily determine with assurance, safe implantation paths through which probes can be driven without affecting any blood vessels.

Presently, the search for available probe implantation paths through the labyrinth of veins and arteries in the brain is carried out by means of angiographs of the patient's brain. Tomographs are also used to complete the image necessary to arrive at a diagnosis. Up to date, more them 1500 probes have been implanted and the method used has been found awkward because of the restraint resulting from the fact that the probes have to be introduced perpendicularly to the profile plane of the head. For medical reasons, neurosurgeons have, for a long while, wanted to get away from this restraint and have sought the possibility of reaching any zone of the brain by using all potentially available directions for implanting probes.

The solution proposed by the present invention is based on the application, to radiography, of a principle known as stereophotogrammetry. Stereophotogrammetry may be broadly defined as a science intended to obtain various measurements from their stereoscopic images of the object, that is from two images of that object taken from two different viewing directions. From the start, this science has been used chiefly in establishing maps from aerial photographies. However, its basic principles are just as well applicable to other types of images, such as radiographs.

From the middle of the present century, much has been written about photogrammetry in relation to radiography. Studies have recently shown that it is possible to locate, by modern photogrammetric methods, a radiographed point with an accuracy of the order of 0.1 mm. Based on this acquired knowledge, the simulator according to the present invention has been devised and it allows, as a preliminary important step, the determination on a stereoscopic view of the brain of potential paths that can be followed by probes to reach predetermined points in the brain without any danger of striking a vein or an artery.

The principle underlying the present invention is an extension of a concept well known in photogrammetry which is the "floating point", or floating mark. The term "floating" comes from the possibility to move a reference point anywhere within the whole space of the model of an object seen in stereoscopy. To achieve this movement, it is sufficient to move the reference point in relation to the stereoscopic image. In photogrammetric language, this means modifying the x-parallax of the reference point along with tis x and y movements to thus change its position in space in the stereoscopic model of the object.

Now, if it is possible to float one such reference point, it is surely possible to float two of them and if both points are joined, by using some artifice, then it becomes possible to create a "floating line".

By assimilating this floating line physically to a probe, it will be appreciated that the probe may be displaced through a three-dimensional view of a patient's brain, obtained by known stereoscopic methods. In this manner, it becomes possible to establish various potential paths, through the brain, which would be suitable for the implantation of a probe. By means of a technique, again derived from photogrammetry, the precise position of the path can be obtained by measuring the image positions.

OBJECTS OF THE PRESENT INVENTION

An object of the present invention is therefore to avoid the above-mentioned limitation with respect to having to implant probes perpendicularly to the profile plane of the head of a patient.

Another object of the invention lies in providing a mechanical, optical and analytical aid for use in determining probe implantation paths, through the brain, which would not intersect any veins or arteries.

Another object of the invention is to provide a neurosurgeon, studying a stereoscopic image of the network of blood vessels in the brain, with a simulator suitable for him to displace freely, within this stereoscopic image, a floating line simulating a probe so that he can determine one or several potential paths that can eventually be used during actual implantation of the probe or probes, without damaging any veins or arteries of the network. It may also be added that the invention applies as well to the fields of biopsies, cancer treatments, other surgical interventions or even in other scientific applications.

SUMMARY OF THE INVENTION

Accordingly, the invention proposes a simulator comprising a support having a flat top surface for mounting stereoradiographs so disposed for stereoscopic viewing. An elongated ruler lies over the flat top surface and is made to be displaced in translation over the top surface and over the stereoradiographs. A pair of transparent flat plotting plates, each having a circular hole with a transparent circular disc rotatable around the hole, is mounted for sliding displacements along the rule above the support top surface and above the stereoradiographs. Each disc has a radial line drawn or engraved on it. This radial line gives a "floating line" in the stereoscopically viewed model, which permits to simulate the image of a probe to be implanted.

A description now follows of a preferred embodiment of the invention having reference to the appended drawings wherein.

DETAILED DESCRIPTION

Figure 1:
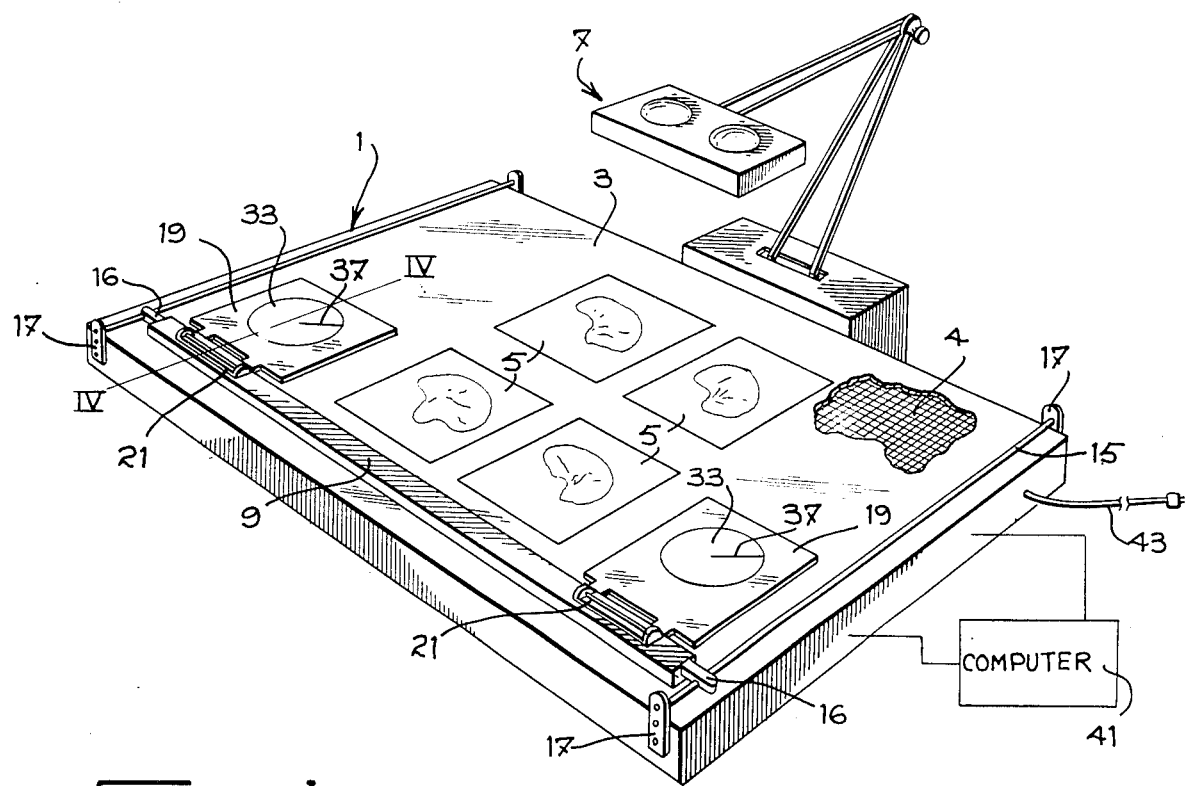
FIG. 1 is a perspective view of a simulator made according to the invention.

The illustrated simulator includes a support 1 having a flat top surface 3 incorporating a plotting grid 4, only a portion of which is shown for purposes of clarity. The support 1 is used for properly positioning one or two pairs of stereoradiographs, two pairs 5, 5' being used here. One such pair is actually that of angiographs of the veins of a patient's brain, the other pair being that of angiographs of the arteries. The angiographs are properly positioned to be viewed by a stereoscope 7 of conventional type which is not part of the invention. The angiographs are secured on the top surface 3 in any convenient manner such as by means of adhesive strips at the corners.

An elongated ruler 9 lies freely over the surface 3 and is movable in translation thereon by means of sleeves 11 which are bored at 13 for sliding displacement along fixed parallel rods 15 secured to the support 1 by brackets 17, the sleeves 11 having lateral arms 16 by means of which they may be screwed onto the ends of the ruler 9.

Hereinafter, the X axis coinsides with the main axis of the elongated ruler 9 and the Y axis coinsides with the direction of the movement of the ruler 9.

Figure 4:
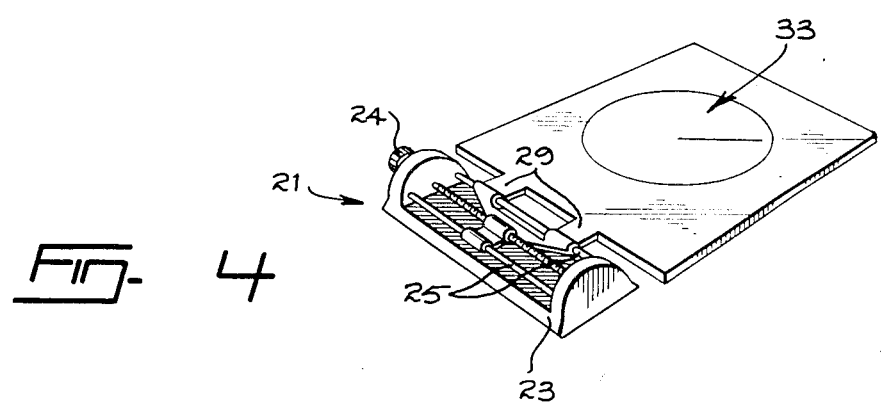
FIG. 4 is a perspective view of the microsliding system used for accurately positioning each plotting plate.
Figure 4A:
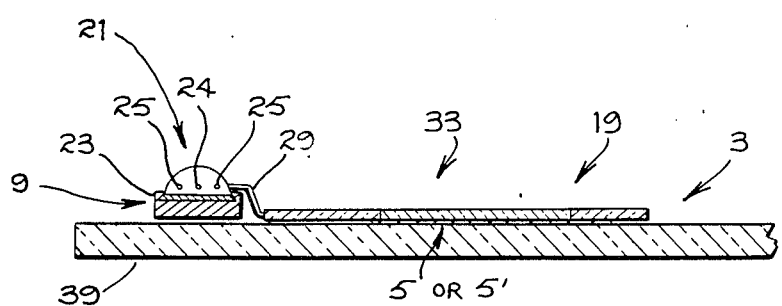
FIG. 4a is a cross-sectional view taken along line IV—IV of FIG. 1.

A pair of transparent, flat plotting plates 19 are mounted for free sliding displacement along the ruler 9. The mounting is by means of a slide 21 illustrated in detail in FIG. 4. Each slide 21 is composed for example of a dovetail type plate 23 that assure macro-sliding with the ruler 9. On the top of the dovetail type plate 23 is fixed the micro-sliding system composed of, for example, a ball screw 24 two cylindrical guides 25. A fixing lug 29, to which the corresponding plotting plate 19 is fixed, is secured to the slide 21 by any known means such as bolts.

Figure 5:
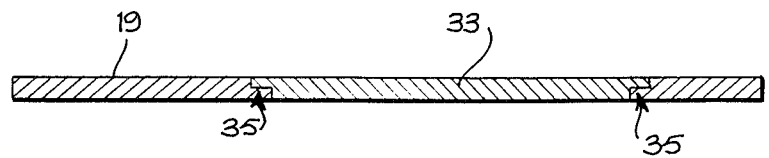
FIG. 5 is a cross-sectional view of a plotting plate according to a variant.
Figure 6:
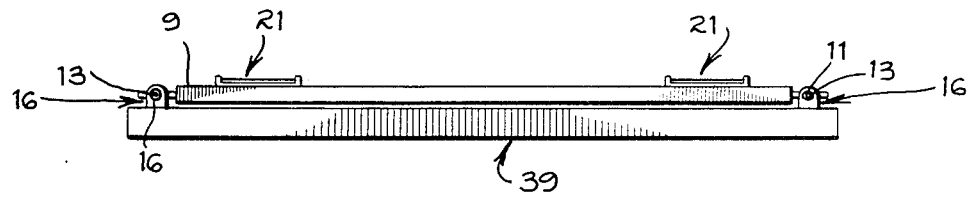
FIG. 6 is an elevation view of a sliding ruler as used in the simulator of FIG. 1.

Each plotting plate 19 is furnished with a circular hole through it into which a circular transparent disc 33, of like diametric dimension, is mounted for rotation. The aforesaid hole may be a through hole in which case the disc 33 lies flat over the support top surface 3 and, when plotting plate 19 is appropriately moved, over the stereoradiographs 5, 5'. As a variant, shown in FIG. 5, the disc 19 may be furnished, at the bottom of the hole, with an inwardly turned shoulder 35 for supporting the disc 33.

Figure 2:
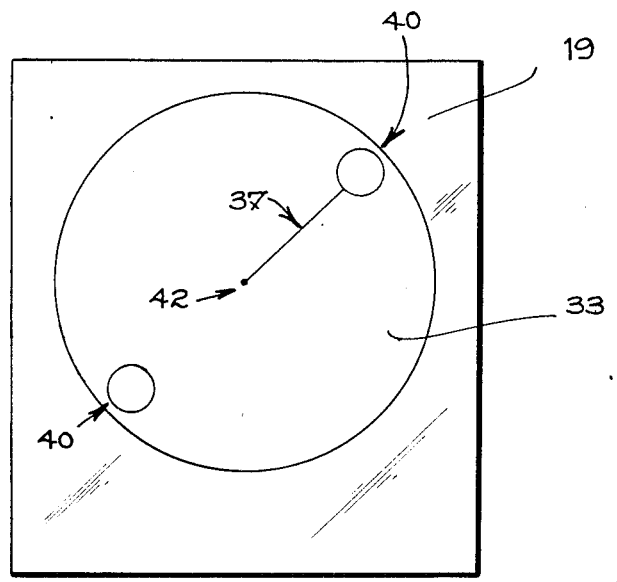
FIG. 2 is a top plan view of a plotting plate.
Figure 3:
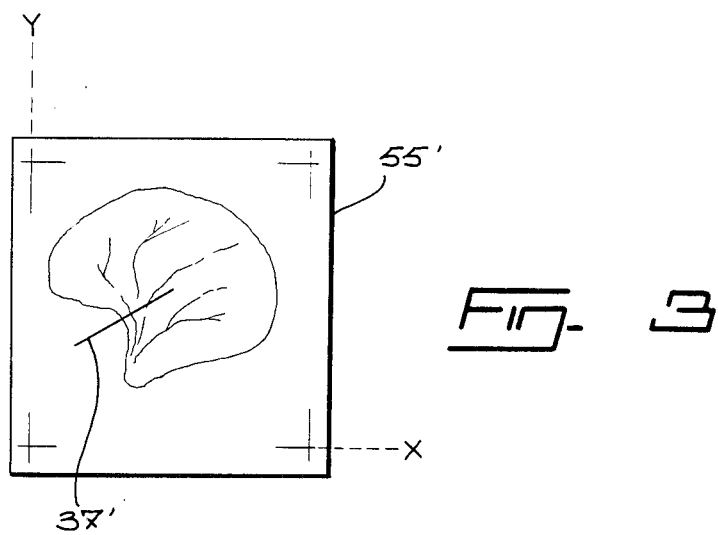
FIG. 3 is a top plan view of a radiograph, as used in the simulator of FIG. 1.

Each disc 33 is furnished with a radial line 37 (FIG. 2) which simulates the probe, as will later be explained. This line 37 is preferably a narrow line drown or engraved on the side of the disc 33 facing toward the flat top surface 3 of the support 1. According to one embodiment, a small plotting dot 42 (FIG. 2) is placed at the center of the disc 33. This dot 42 is intended to be moved over the area or zone, hereinafter called the target point, of the brain. A minimum of two plotting means, such as measuring coils 40, are placed on the prolongation of the line 37 preferably at the periphery of the disc 33 and preferably on both sides of the plotting dot 42.

The plotting plates 19 and discs 33 can be made of acrylic material (transparent).

According to another embodiment, the top surface 3 is that of a top translucent glass plate 39 (FIG. 4) and the plotting grid 4 is an electric wire grid embedded in plate 39 and of which the X and Y coordinate axes are electrically connected to a computer 41. A light source (not shown) is provided beneath the glass plate 39, having an electric feed line 43.

The above described simulator is used as follows, assuming that the two pairs of angiographs 5, 5' are properly fixed over the plotting grid 4 so that the images thereon fuse when viewed through the stereoscope 7, whether the lower angiographs 5 or the upper angiographs 5' are abing viewed. The distance between the angiographs is selected for use with the stereoscope 7.

The plotting plates 19 are then moved over the support top surface 3 until the discs 33 thereof lie over the bottom angiographs 5 and this is obtained both by translation of the ruler 9 and sliding of each slide 21. While viewing through the stereoscope 7, the neurosurgeon causes the fused centers of the discs 33, by sliding the plotting plate 19, to lie on the target point. The radial lines 37, which would jointly simulate the probe to be implanted, are then rotated about the centers of the discs until the fused lines 37 avoid any blood vessels visible on the fused angiographs 5. Thereafter, the plotting discs 33 are moved up over the upper angiographs 5' (manually or mechanically by means of a stepping motor) so that the line 37 can be viewed in exactly the same position as in the angiographs 5. The probe simulation line 37 (floating line) is then checked for possible interception with the blood vessels three-dimensionally viewed from the upper angiographs 5'. If there is obstruction, then the discs 33 are rotated to avoid it and they are brought back over the angiographs 5 for a new control. The process is repeated until there is found a vessel-free path for the probe line 37.

Once this has been achieved, the discs 33 are placed over the angiographs 5 and then, as example, the X and Y coordinates of a minimum of two point of the line 37 are read electrically by means of the plotting grid 4 and the coils 40. Then these coordinates are transferred, by known transfer means, into the computer 41 for later use in a photogrammetric treatment in order to provide the required spatial position of the target point defined by the dot 42; and of the floating line corresponding to a possible path for actual implantation of a probe. The concept of the floating line which is a vital part of the present invention is in the domain of photogrammetry. The subsequent implantation technique, which is not part of the present invention, involves the use of a probe guiding tool having a reference system which agrees totally with that defining the coordinates of the photogrammetric control points.

Although reference has been made hereinabove exclusively to a plotting grid 4 for use with coils as plotting devices 40, it should be understood that use could also be made of any other kind of plotting equipment known per se, such as, for example, ultrasonic or photosensible plotting equipments.

What is claimed is:

1. A simulator for use with stereoradiographs, as a neurosurgical aid, in locating potential paths for the implantation of probes in selected locations of a human body, said simulator comprising:
   a support having a flat top surface for mounting thereon radiographs for stereoscopic viewing;
   means incorporated into said support for allowing determination of the coordinates of a point on said top surface;
   an elongated ruler lying over said flat top surface;
   means at the ends of said support and at the ends of said ruler cooperating together for moving said ruler in translation over said top surface and between said support ends;
   a pair of transparent flat plotting plates, each plate having a circular hole therethrough and comprising a transparent circular disc rotatable within said hole and means defining a radial line extending from the center of said disc; and
   means mounting said plates and discs for sliding displacement along said ruler above said table top surface.

2. A simulator as claimed in claim 1, further including means adapted for adjusting said plotting plates and discs separately with respect to the ruler so that said plates and discs may subsequently be displaced simultaneously each over one of said stereoradiographs.

3. A simulator as claimed in claim 1, wherein each of said discs is engraved with a plotting dot at the center thereof and is provided with two plotting means placed away from said central plotting dot along said radial line, said plotting means cooperating with said means incorporated into the support for determining the coordinates of said radial line.

4. A simulator as claimed in claim 3, wherein the radial line of each disc is located on the side of said disc facing toward said flat top surface of said support.

5. A simulator as claimed in claim 4, wherein said line defining means are narrow lines engraved or drawn on the surfaces of said discs.

6. A simulator as claimed in claim 5, wherein said plotting means are at the periphery of said discs.

7. A simulator as claimed in claim 6, wherein said plotting means are on both sides of said plotting dot.

8. A simulator as claimed in claim 3, wherein:
   said support comprises a top panel made of a material allowing light therethrough,
   said coordinate determining means comprise a wire grid embedded in said top panel material, and
   said plotting means consist of coils.

9. A simulator as claimed in claim 7, wherein said top panel material is made of a translucent material and further comprising a light source beneath said top panel.

10. A simulator as claimed in claim 3, further including means adapted for moving said plotting plates and discs separatly with respect to the ruler so that said plates and discs may subsequently be displaced each over one of said stereoradiographs.

11. A simulator as claimed in claim 1, wherein said coordinate determining means consists of a grid printed on said top surface and said plotting means consist of coils.

* * * * *